United States Patent [19]
Welch

[11] 3,968,456

[45] July 6, 1976

[54] REGENERATIVE LASER DEVICE

[75] Inventor: Albert B. Welch, Dallas, Tex.

[73] Assignee: Vought Corporation, Dallas, Tex.

[22] Filed: Nov. 24, 1967

[21] Appl. No.: 686,383

[52] U.S. Cl. .............................. 331/94.5 C; 330/4.3; 250/199
[51] Int. Cl.² ........................ H01S 3/05; H01S 3/09
[58] Field of Search ............... 331/94.5; 250/199; 330/4.3

[56] References Cited
UNITED STATES PATENTS

| | | | |
|---|---|---|---|
| 3,292,102 | 12/1966 | Byrne | 331/94.5 |
| 3,365,678 | 1/1968 | Maurer | 331/94.5 |
| 3,378,686 | 4/1968 | Langmuir | 250/199 |
| 3,414,836 | 12/1968 | Clark et al. | 331/94.5 |

Primary Examiner—Nelson Moskowitz
Attorney, Agent, or Firm—H. C. Goldwire; Jack A. Kanz; Robert M. Sperry

[57] ABSTRACT

A regenerative laser device having remotely located optical components. A resonant cavity having a plurality of transverse modes is defined at one end by a highly reflective retrodirective member and at the other end by a retrodirective member formed of a converging lens and a highly transmissive mirror. A body of laser material is located within the resonant cavity, and there are provided means for exciting the material to create a loop gain of the device that is substantially equal to unity. A collimating lens receives light transmitted through the mirror. An energy source supplies additional energy into the resonant cavity through the collimating lens and mirror to increase the radiation, in at least one of the transverse modes, in the resonant cavity.

8 Claims, 1 Drawing Figure

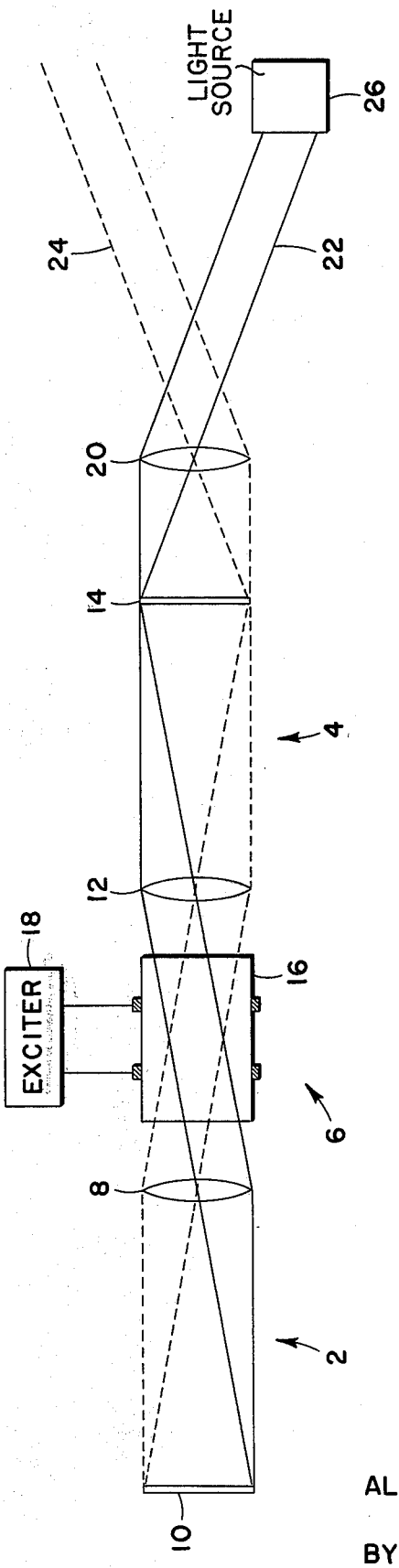

REGENERATIVE LASER DEVICE

This invention relates to lasers and is particularly directed to regenerative laser devices having remotely located optical components.

As is well known, any laser includes a body of material which is excitable to fluorescence and which is capable of energy state population inversion. Such material may be referred to as "laser material." To form a laser, a body of laser material is usually located within a resonant cavity defined by a pair of reflective members. Most prior art laser devices require that the reflective members be located in proximity with the body of laser material and that the orientation of the reflective members be rigidly fixed. However, in the copending application of John N. Monroe, Ser. No. 520,821 filed Dec. 20, 1965, entitled "Laser Method and Apparatus," a laser device is disclosed wherein at least one of the reflective members is located remotely from the body of laser material and the orientation of the reflective members is quite flexible. Laser devices of the type disclosed in said copending application may be referred to as "remote optics lasers" and have numerous advantages over conventional, prior art laser devices. On the other hand, with remote optics lasers of the Monroe configuration, the optical path between the reflective members is extremely long and the cavity attenuation is often correspondingly high. Since the gain through the body of laser material must exceed the cavity attenuation in order to achieve lasing operation, the laser gain requirements of remote optics lasers of the Monroe configuration are excessive. These disadvantages of prior art laser devices are overcome with the present invention and a novel laser configuration is provided which achieves the advantages of remote optics laser devices while greatly reducing the laser gain requirements heretofore associated with such devices. Moreover, the device of the present invention has several advantages which were not obtainable heretofore even with remote optics laser devices.

The advantages of the present invention are preferably attained by providing a laser device having a first retrodirective member, a second retrodirective member of relatively high transparency cooperating with said first retrodirective member to define a resonant cavity having a plurality of transverse modes, a body of laser material within said resonant cavity, means for exciting said body of material to a predetermined gain level, and means external to said resonant cavity for applying radiation into said cavity through said second retrodirective member to increase the radiation in at least an appropriate one of said modes.

Where the predetermined gain level is slightly below the threshold for lasing operation, the action of the laser device of the present invention may be compared with the action of a regenerative radio receiver wherein the feedback is adjusted to a value just on the verge of oscillation and the introduction of a very small amount of signal at the correct frequency is readily detectable. Hence, where the external means is a retrodirective member, the radiation reflected therefrom provides a feedback which effectively reduces the loop attenuation in the particular transverse mode within the cavity, causing lasing oscillation to occur between the first retrodirective member and the external means. Where the external means is a light source, such as a laser, the device of the present invention may be used as a very sensitive receiver and amplifier of appropriate laser signals. Alternatively, the predetermined gain level may be slightly above the threshold for lasing operation and oscillation may be allowed to build up and be quenched in the manner of a super-regenerative radio. In this instance, the device of the present invention serves both as a transmitter and a sensitive receiver. Additionally, the device of the present invention may be used to detect radiation emitted from the resonant cavity and returned thereto by reflection from cooperating or non-cooperating objects within its field of view and, hence, may be employed to detect and locate such objects.

Accordingly, it is an object of the present invention to provide an improved laser device.

Another object of the present invention is to provide an improved remote optics laser.

An additional object of the present invention is to provide a highly sensitive detector for laser signals.

A further object of the present invention is to provide a laser device which is capable of regenerative or super-regenerative operation.

Still another object of the present invention is to provide a laser device for detecting and locating reflective objects within its field of view.

A specific object of the present invention is to provide a laser device having a first retrodirective member, a second retrodirective member of relatively high transparency cooperating with said first retrodirective member to define a resonant cavity having a plurality of transverse modes, a body of laser material disposed within said resonant cavity, means for exciting said body of material to a predetermined gain level, and means external to said resonant cavity for applying radiation into said cavity through said second retrodirective member to increase the radiation in at least an appropriate one of said modes.

These and other objects and features of the present invention will be apparent from the following detailed description, taken with reference to the accompanying drawing.

The FIGURE is a diagrammatic representation of a laser device embodying the present invention.

In that form of the present invention chosen for purposes of illustration, the FIGURE shows a pair of retrodirective members, indicated generally at 2 and 4, respectively, cooperating to form a resonant cavity, indicated generally at 6. Preferably, retrodirective member 2 comprises the combination of a converging lens 8 and a substantially totally reflective mirror 10. However, it should be understood that any suitable retrodirective means of substantially total reflectivity may be employed as retrodirective member 2, provided it permits establishment of a plurality of transverse modes. Retrodirective member 4 comprises a converging lens 12 and a mirror 14 of relatively high transparency. For example, mirror 14 may reflect 10% of the light incident thereon. A body 16 of laser material is disposed within the resonant cavity 6 between the retrodirective members 2 and 4 and suitable means 18 are provided for exciting the body 16. In addition, a collimating lens 20 is provided and is positioned so that the focal plane of the collimating lens 20 coincides with the location of mirror 14. The lens 20 provides a field of view for radiation from the resonant cavity 16, as indicated by beam paths 22 and 24, and radiation incident on lens 20 from any object 26 located within the field of view will be focussed by lens 20 on the highly transparent mirror 14 and, hence, most of the radiation will be introduced into the resonant cavity 16. It will be apparent that this will be true regardless of whether the radiation from object 26 is direct or reflected. Thus, object 26 may be a source of either direct radiation, such as a laser device oriented to cause its output beam to be incident on lens 20; or reflected radiation, such as a retrodirective member or any other object having a surface oriented to receive radiation from lens 20 and to reflect at least a portion of the radiation to be incident on lens 20.

In operation, exciter 18 serves to pump body 16 of laser material to an energy level such that the loop gain (gain-to-loss ratio) within the resonant cavity 6 is slightly less than unity. Under these conditions, lasing operation will not occur. However, the introduction into resonant cavity 6 of even a slight amount of additional reflected radiation, as from object 26, will raise the loop gain above unity and will establish lasing operation between retrodirective member 2 and the source of the additional radiation (object 26).

To illustrate this more precisely, if the one-way gain through the body 16 is represented by A, the round-trip transmission factor for retrodirective member 2 by $r_1$, and the round-trip transmission factor for retrodirective member 4 by $r_2$; the loop gain may be represented by G and given by $$G = A^2 r_1 r_2 \quad \text{(Eq. 1)}$$

Assuming a laser gain of approximately 10 decibels and assigning typical values, let $A = 10.2$, $r_1 = 0.98$, and $r_2 = 0.10$. Inserting these values in Equation 1 yields a loop gain of $G = 0.9996$. Since this is less than unity, lasing operation will not occur. However, this ignores the introduction of additional energy, as from object 26. Thus, letting $r_3$ represent the transmission factor for light passing from body 16, through retrodirective member 4 (that is, through lens 12 and highly transparent mirror 14), through lens 20, reflecting from object 26, and returning through lens 20 and retrodirective member 4 into body 16, and assuming a 30 decibel loss for this path, $r_3 = 0.001$ and the loop gain becomes $$G = A^2 r_1 (r_2 + r_3) = 1.0096 \quad \text{(Eq. 2)}$$

Since this value is greater than unity, lasing oscillation will occur between retrodirective member 2 and the object 26. Thus, the device of the present invention functions as an oscillator and the additional radiation reflected from object 26 serves as a feedback which greatly reduces the gain required to establish and maintain lasing oscillation between retrodirective member 2 and the remote object 26. Because the amount of additional radiation needed to trigger lasing of cavity 6 is quite small, it has been found that, where light from the cavity 6 is reflected from the object 26 and returned to the cavity 6, the location of the object 26 can be detected and lasing operation can be maintained at ranges up to several miles. Similarly, where the object 26 is a laser oriented to direct its beam to be incident on lens 20, the device of the present invention functions in a manner analogous to a regenerative radio circuit and serves as a highly sensitive detector of radiation at the resonant frequency of cavity 6 emitted by an object 26 located anywhere within the field of view indicated by beam paths 22 and 24.

It has also been found that, if the loop gain of the resonant cavity 6 is a value greater than unity, and oscillation is allowed to build up and then is quenched periodically, the device of the present invention functions in a manner analogous to a super-regenerative radio circuit and can serve both as a transmitter and a highly sensitive receiver of laser radiation.

It will be apparent to those skilled in the art that suitable filters, modulators, demodulators, or analyzers could be introduced into the optical train of the present invention as desired. In addition, numerous other variations and modifications may, obviously, be made without departing from the present invention. Accordingly, it should be clearly understood that the form of the present invention described above and shown in the FIGURE of the accompanying drawing is illustrative only and is not intended to limit the scope of the present invention.

What is claimed is:

1. A laser device comprising:
   a body of material capable of energy state population inversion;
   a first retrodirective member positioned adjacent one end of said body and formed of a converging lens and a highly transmissive mirror which reflects less than half of the radiation incident thereon;
   a second highly reflective retrodirective member positioned adjacent the opposite end of said body and cooperating with said first retrodirective member to define a resonant cavity having a plurality of transverse modes;
   a collimating lens located outside of said resonant cavity and positioned with the focal plane of said collimating lens extending coincident with said highly transmissive mirror to cause light occurring in the field of view defined by said collimating lens to be focused on said highly transmissive mirror;
   excitation means for exciting said body of material to an energy level such that the loop gain of said device is substantially equal to unity; and
   energy source means located outside of said resonant cavity for supplying additional energy through said collimating lens and said transmissive mirror to increase radiation in at least one of the transverse modes in said resonant cavity.

2. The device of claim 1 wherein:
   said excitation means excites said body to an energy state population inversion such that said loop gain is substantially equal to but slightly less than unity.

3. The device of claim 1 wherein:
   said excitation means excites the energy state population inversion of said body to a level such that said loop gain slightly exceeds unity and is periodically quenched.

4. The device of claim 1 wherein:
   said energy source means is a retrodirective member located within the field of view of said collimating lens.

5. The device of claim 1 wherein:
   said energy source means is an object capable of receiving light from said collimating lens and reflecting at least a portion of said light back to said collimating lens.

6. The method of operating a laser, said method comprising the steps of:
   establishing a resonant cavity having a plurality of transverse modes and including retrodirective member formed of a lens and a highly transmissive mirror which reflects less than half of the radiation incident thereon as one end of said cavity;

disposing a body of laser material within said cavity, positioning a collimating lens with its focal plane coincident with said highly transmissive mirror to receive and collimate into a beam energy transmitted by said highly transmissive mirror;

exciting said body of laser material to an energy level such that the loop gain of said cavity is substantially equal to but less than unity; and introducing radiation from a remote device in the field of view of said collimating lens through said mirror into said laser cavity to increase the radiation in at least one of said transverse modes.

7. The method of claim 6 wherein:

the introduced radiation is reflected from a device within the field of said collimating lens and oriented to receive energy transmitted through said mirror and to reflect said energy back to said collimating lens.

8. The method of operating a laser, said method comprising the steps of:

establishing a resonant cavity having a plurality of transverse modes and including a retrodirective member formed of a lens and a highly transparent mirror which reflects less than half of the radiation incident thereon as one end of said cavity, disposing a body of laser material within said cavity, exciting said body of laser material to an energy level such that the loop gain of said cavity is substantially equal to but slightly less than unity, and increasing the loop gain to greater than unity in at least one of said modes within said cavity by introducing additional radiation into said cavity through said mirror.

* * * * *